Feb. 7, 1961

E. F. FEIGL 2,970,762

INTERPOLATING DEVICE

Filed Feb. 2, 1953

5 Sheets-Sheet 1

INVENTOR.
ERICH F. FEIGL

BY Ostrolenk & Faber

ATTORNEYS

INVENTOR.
ERICH F. FEIGL

BY Ostrolenk & Faber

ATTORNEYS

INTERPOLATING DEVICE

Filed Feb. 2, 1953

5 Sheets-Sheet 3

INVENTOR.
ERICH F. FEIGL

BY Ostrolenk & Faber

ATTORNEYS

INVENTOR.
ERICH F. FEIGL

BY Ostrolenk & Faber

ATTORNEYS

Feb. 7, 1961 | E. F. FEIGL | 2,970,762

INTERPOLATING DEVICE

Filed Feb. 2, 1953 | 5 Sheets-Sheet 5

INVENTOR.
ERICH F. FEIGL

BY Ostrolenk & Faber

ATTORNEYS

United States Patent Office 2,970,762

Patented Feb. 7, 1961

2,970,762

INTERPOLATING DEVICE

Erich F. Feigl, Los Angeles, Calif., assignor to Standard Coil Products Co., Inc., Los Angeles, Calif., a corporation of Illinois Filed Feb. 2, 1953, Ser. No. 334,690

5 Claims. (Cl. 235—132)

My present invention relates to an interpolating device and more particularly to relates to an interpolating device for setting up calibration charts for radiosonde operation.

In radiosonde operations three different coded signals are sent out, one for temperature, a second for pressure and a third for humidity. A disc with sets of different grooves is employed for controlling the signalling. One groove of one of these sets may represent a particular pressure; a second groove of the same set may represent a different pressure, etc.; one groove of another of these sets may represent a particular temperature; a second groove of this second set may represent a different temperature, etc., and one groove of the third set may represent a particular humidity, a second groove of this third set a different humidity, etc.

After the radiosonde apparatus has been constructed, it is necessary that a test be made to determine what particular signal code is sent out for a particular pressure for that particular apparatus since, for example, groove 2 of a particular radiosonde apparatus may correspond to 300 millibars for that particular apparatus, while it may correspond to 350 millibars for a different apparatus. Therefore, it is necessary to set up calibration charts for each unit before it is put into use, and the calibration can be performed if a certain number of tests are made for pressure, temperature and humidity.

More specifically, if three different tests are made at three pressures over the entire range, it should be possible using these values of pressures to set up a complete calibration chart for all the other pressures in this range. The same should be possible for humidity and temperature.

The setting up of such a calibration chart is made possible by my present invention which consists essentially of systems of counters, two of which are connected to mechanical counters to give direct readings of the coordinates of points of this calibration chart, while a third set of counters provides compensation which becomes necessary when the curve to be plotted is not linear.

For example, if one reading was taken at a pressure of 249 millibars giving a signal corresponding to groove No. 8 in a disc of a certain radiosonde apparatus and a second reading at a pressure of 622 millibars gave a signal corresponding to groove No. 97 in the same disc, while a third reading of 1061 millibars gave a signal corresponding to groove No. 203, it is now possible to set up a complete calibration chart giving all other pressures in between the values found.

In order to achieve this result in one example of my present invention, systems of binary counters are used. A first binary counter, for example, is set for a value of 89 in the above example where 89 is the difference between 8 and 97, the two respective grooves corresponding to pressures of 249 millibars and 622 millibars. A second binary counter, on the other hand, is set at 373 which again represents the difference between the actual pressures 622 millibars and 249 millibars in these examples.

It is here necessary to point out that since binary counters are used in this example, all these numbers will not be set using decimal notation but using instead binary notation, that is, using a system of notation having a radix of 2.

It is quite evident though that if an octal system of notation is used, then octal counters would be substituted for the binary counters and if a decimal system of notation is used, decade counters would be substituted for the binary counters. The main difficulty in using, for example, the decimal system of notation is in the fact that decade counters have a considerably more complex circuit than binary counters. In this example, therefore, the description will be limited to a system for interpolating using only binary counters.

Attached to each binary counter is a mechanical counter. One of these mechanical counters is set at a value of 249 which in this example represents the first pressure reading. The second mechanical counter is set at 8 which in this example represents the groove setting for the first reading.

In order to show more clearly the operation of the two main electrical counters, it will now be assumed that a counter, the divisor, is set at 10 and the other counter, the dividend, is set at 100. If a pulse generator is now applied to the two counters after ten pulses the divisor counter will send one pulse to its mechanical counter which will then register 1; at the same time, the ten pulses are fed to the dividend counter, but since the dividend counter is set at 100, the number of pulses (10) is not sufficient to produce an operation of the mechanical counter associated with the dividend counter. After 10 more pulses, the mechanical counter associated with the divisor counter will register 2 while nothing will yet appear on the mechanical counter associated with the dividend counter.

This process continues until 100 pulses are fed to both counters. At this time the mechanical counter associated with the divisor counter will register 10, while the mechanical counter associated with the dividend counter will receive a pulse from the dividend counter and will thus register 1. Now the dividend counter will send a negative pulse to the pulse generator, thus stopping its operation.

It is now evident that the mechanical counter actually gives the coordinates of points of a curve which for the above example could have been 0, 0 and 10, 1. If the next coordinates are desired, another 100 pulses are fed to the two counters so that at the end of this process the mechanical counter associated with the divisor counter will register 20 while the mechanical counter associated with the dividend counter will register 2. Therefore, 20, 2 are the coordinates of another point of a certain curve. If this is repeated any number of points defining a certain curve will be easily obtained.

Returning now to the previous example, while the first binary counter is set for a value of 89 where 89 is the difference between groove 8 and groove 97 corresponding to pressures of 249 millibars and 622 millibars. The second binary counter is set at 373 which again represents the difference between the actual pressures 622 millibars and 249 millibars. On the other hand, the mechanical counter associated with the divisor counter is set at a value of 249 which in this example represents the first pressure reading. The other mechanical counter which is connected to the dividend counter is set at 8 which in this example represents the groove setting for the first reading.

The two binary counters will now divide 89 which is the difference between groove 8 and groove 97 into 373 which is the difference between the pressure 622 millibars and that of 249 millibars in the same way as was described when divisor counter was set at 10 and dividend counter was set at 100. When the first 89 pulses are fed into the two binary counters, the divisor counter will send a pulse to its mechanical counter so that it now reads 250. After 89 more pulses, another pulse is sent by the divisor counter to its mechanical counter so that it reads 251. This process is repeated until 373 pulses are fed into the two counters. At that time the mechanical counter associated with the divisor counter will register 253 while the mechanical counter associated with the dividend counter will register 9, that is, 8 plus 1, the 1 being produced by a pulse which the dividend counter sends to its mechanical counter after 373 pulses.

Actually when 89 is divided into 373 the quotient is 4 with the remainder of .191. Therefore, while the mechanical counter associated with the divisor counter will read only 249 plus 4, that is 253, the remainder .191 will be left in the divisor binary counter. As above mentioned, when the mechanical counter associated with the divisor counter registers 253 millibars, the mechanical counter associated with the dividend counter registers 9 so that the operator can easily see that to groove No. 9 corresponds the pressure of 253 millibars. After this first operation, another division is made with 89 as the divisor and 373 as the dividend which again comes out with a quotient of 4 with the remainder of .191. This 4 is again added to 253 so that the next reading of the pressure will be 257 with a remainder of .191 plus .191.

Simultaneously, the other secondary counter jumps one step from 9 to 10. This procedure continues until a complete chart is obtained.

It was previously mentioned that the operator would see the results of the above-described operations and that he could, therefore, record them. It is known, on the other hand, that instead of an operator the mechanical counters could be connected to a printing device operating together with a rotating roll of paper so that it can record on the roll of paper the results obtained from the binary counters. From the above it is evident that the line under consideration was of a linear nature since the slope was constant and equal to 4.191.

It is found that while pressure and temperature curves are straight lines, the humidity curve is of a non-linear character and thus during its plotting requires a certain amount of compensation for its slope. In other words, while for pressure and temperature one slope reading is sufficient, for humidity every infinitesimal section of the curve will have a different slope so that the coordinates of each of its points will have to be modified in relation to the variation of its slope.

When, therefore, a humidity chart is to be obtained since this curve as previously mentioned is of a non-linear nature some type of compensation must be provided for. This is accomplished in my present invention by adding a third binary counter to the dividend counter. This additional counter may add to the dividend on each operation any number depending upon the slope of the humidity curve. This means that the first division is performed in the same way as explained above, but the second time a division is made a previously set number is added to the dividend counter before the dividing operation and the third time the division is made the same previously set number or another number can be added to the dividend counter before the dividing process and so on until the whole chart is obtained.

The main object of my present invention is, therefore, the provision of means for automatically setting up calibration charts.

Another object of my present invention is the provision of means for compensating for the non-linear nature of some calibration curves.

A further object of the present invention is the provision of means whereby simple flip-flop circuits are used for determining the slope and coordinates of points of any curve.

Another object of my present invention is the provision of means whereby a calibration curve is plotted in a very short interval of time without any help from the operator.

The foregoing and many other objects of my present invention will become apparent from the following description and drawings in which.

Figure 7A:
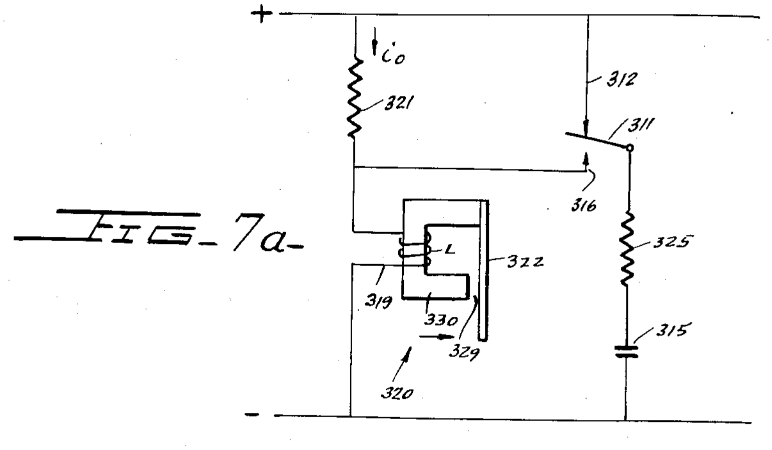

Figure 7*a* is a detailed circuit diagram of my novel switch.

Figure 7B:
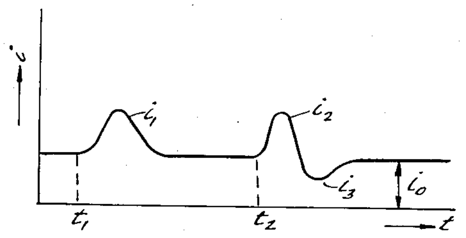

Figure 7*b* is a curve showing the operation of my novel switch of Figure 7*a*.

Figure 8:
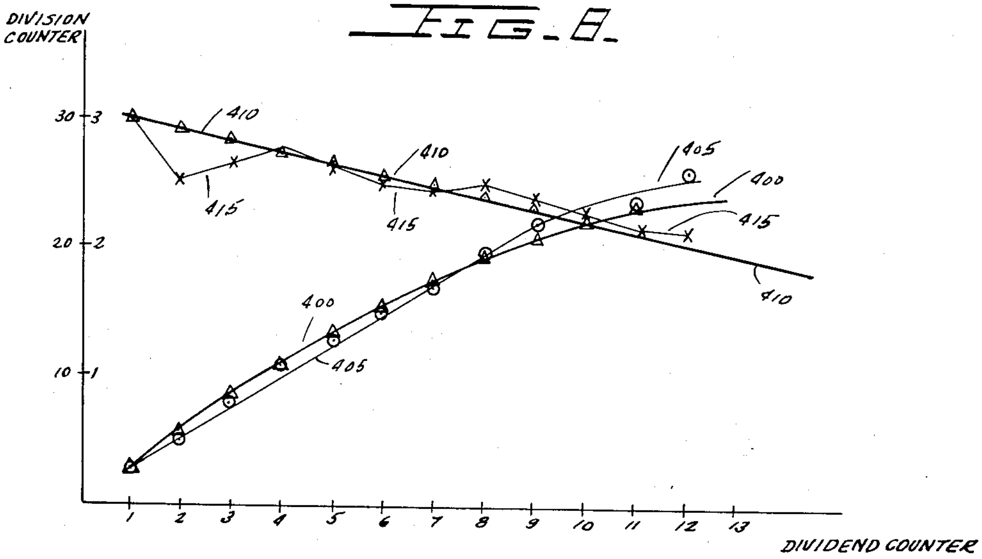

Figure 8 shows curves obtained with my interpolating device for comparison with the corresponding correct theoretical curves.

Figure 1:
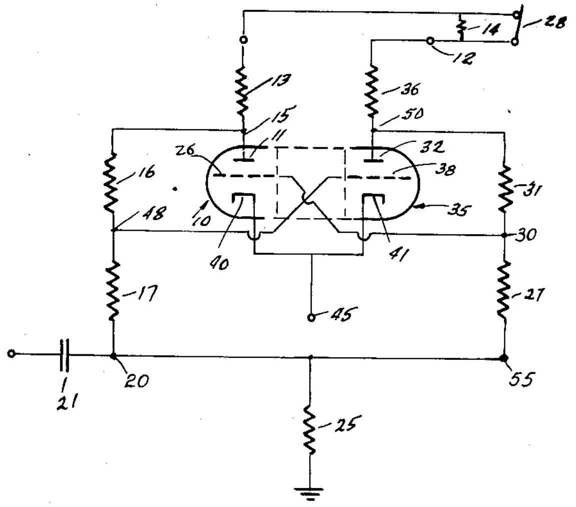
Figure 1 is a circuit diagram of the binary counter used in this invention.

Referring now to Figure 1 showing the flip-flop circuit used in the present invention and from now on referred to as binary counter, triode 10 has its plate 11 connected to the D.C. power supply 12 through load resistance 13 and resistance 14. Plate 11 of triode 10 is also connected at point 15 to resistance 16 in series with resistance 17. Resistance 17 is connected at point 20 to the input capacitance 21. It is also connected to ground through resistance 25 and to grid 26 of triode 10 through resistance 27. Resistance 14 is normally short circuited by switch 28 so that during operation load resistance 13 is connected directly to power supply 12.

To connection 30, at which grid 26 of triode 10 is connected to resistance 27, is connected resistance 31. On the other side of resistance 31 is connected plate 32 of triode 35. Plate 32 of triode 35 is connected to the same power supply 12 through resistance 36. Grid 38 of triode 35 is connected between resistances 16 and 17 at point 48. Cathodes 40 and 41 of triodes 10 and 35, respectively, are connected to another power supply 45.

It is quite evident now that triodes 10 and 35 do not have to be in individual envelopes, but they can easily be sections of a double triode tube. To make the description clearer, it will now be assumed that the voltage of power supply 12 is 300 volts while the voltage of power supply 45 is 150 volts.

Assuming now that at a particular time triode 10 is conducting while triode 35 is non-conducting, it is easily seen that the voltage distribution would be as follows. The upper side of resistances 13 and 36 is at 300 volts. Point 15 is at 190 volts; point 48 is at 130 volts; point 48 is the junction to which are connected resistances 16 and 17 and grid 38 of triode 35. Point 20 is at 105 volts.

Considering now the other triode 35, the voltage at point 50 which is where resistance 31 and resistance 36 are connected to plate 32 of triode 35 is at 230 volts. The voltage at point 30 is 150 volts, while the voltage at point 55 which is where resistance 27 is connected to resistance 25 is at 105 volts. Cathodes 40 and 41 of triodes 10 and 35, respectively, as previously mentioned are connected to a positive voltage of 150 volts.

Since triode 10 is now conducting and triode 35 is not conducting, the voltage at point 15 is 190 volts while the voltage at point 50 is 230 volts. Furthermore, the voltage at point 48, that is, the voltage of grid 38 of tube 35 is 130 compared to the voltage at point 30 which is also the voltage of grid 26 of tube 10 which is 150 volts.

It is now apparent that grid 26 and cathode 40 of triode 10 are at the same potential, in our example 150 volts. Therefore, triode 10 is now conducting. On the other hand, grid 38 of triode 35 is 20 volts below cathode 41 of triode 35. In fact, grid 38 is at 130 volts while cathode 41 is at 150 volts in this example.

It is seen, therefore, that while triode section 10 is conducting, triode section 35 is not conducting. Assuming now that a negative pulse (of a desired voltage) which can also be a square wave is applied to this binary counter through input capacitance 21, the voltage of point 30, that is, the voltage of grid 26 of triode 10 will drop below the cathode 40 potential to a point at which triode 10 becomes non-conducting.

At this point the previously described distribution of voltages is reversed and tube 35 starts conducting since its grid 38 will now rise from 130 volts to 150 volts due to the fact that the voltage at point 15 is now not 190 volts but 230 volts.

Assuming that at the beginning of the counting operation tube 10 was conducting and it is now desired to reset the binary counter 10—35 after completion of one operation, switch 28 is opened so that if at the time when switch 28 is opened tube 35 instead of tube 10 is conducting, the introduction of resistance 14 between load resistance 13 and power supply 12 causes the voltage of point 15, that is, the voltage of plate 11 of tube 10, to drop by a certain amount, function of the magnitude of resistance 14.

This drop in voltage of plate 11 of tube 10 is immediately reproduced at grid 38 of tube 35, causing the previously described cumulative action, with the result that tube 35 will stop conducting while tube 10 will again conduct so that initial conditions are restored and now the binary counter 10—35 may be operated on again.

Figure 2:
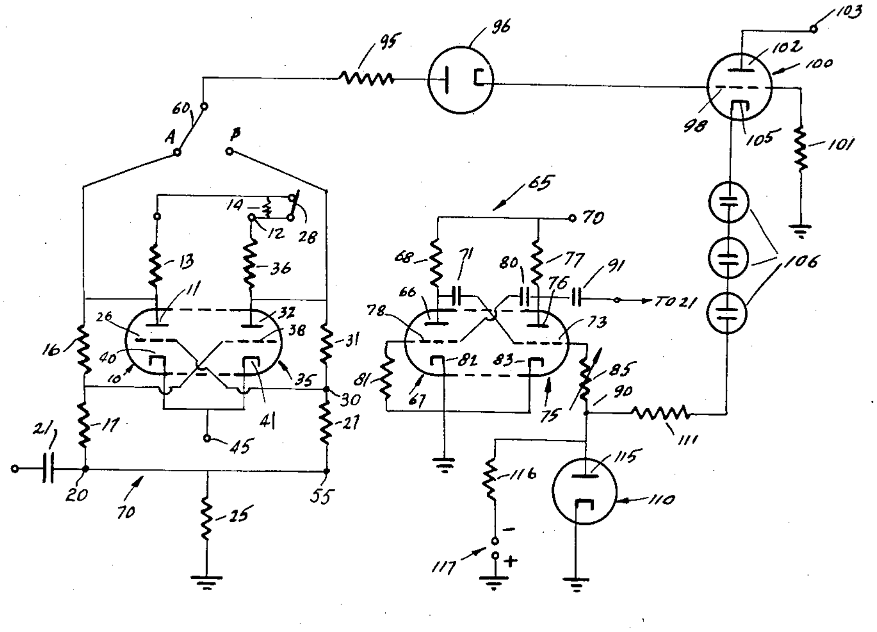
Figure 2 is a simplified circuit diagram of the binary counter system of my invention showing one binary counter and the pulse generator circuit.

Referring now to Figure 2 showing a more complete diagram of my novel apparatus, a switch 60 which is one of the ten switches of the binary system is shown to have two positions, A and B, one position A corresponding to 0 and the second position B corresponding to 1 of the binary system.

As is well-known in the art, a decimal number, that is, a number of a system using a radix of 10 can be easily transformed into a binary system number where a binary system number is one that uses a radix of 2. For example, the decimal number 137 becomes the binary number 10,001,001 which means $$1\times2^7+0\times2^6+0\times2^5+0\times2^4+1\times2^3+0\times2^2+0\times2^1+1$$

which is equal to 128+8+1 equal to 137.

It is also found that the capacity of a circuit using binary counters, that is, the maximum decimal number that can be introduced into such a circuit is equal to $2^n-1$ where $n$ is the total number of binary counters forming such a circuit.

In other words, a circuit having ten binary counters has a capacity of $2^{10}-1$, that is, 1024−1 equal to 1023. In other words, a system using ten binary counters can operate with numbers up to 1,023 since if the 1,024th pulse is introduced into such a system, the numerical configuration will return to 0.

When, therefore, switch 60 is at position A, one signal pulse will be transmitted since position A as previously mentioned corresponds to the number 0. If, on the other hand, switch 60 is thrown at position B, which as previously mentioned corresponds to 1, two pulses will be transmitted as hereinafter described.

Oscillator 65 serves to generate the pulses necessary to operate the binary counter 70 which is of the type described in connection with Figure 1. Oscillator 65 in this case consists of two tubes connected to form a flip-flop circuit which is commonly known as multi-vibrator.

More particularly, plate 66 of triode 67 is connected through resistance 68 to a power supply 70. Plate 66 is also connected through capacitance 71 to grid 73 of triode 75. Plate 76 of triode 75 is connected through resistance 77 also to power supply 70 and plate 76 is connected to grid 78 of triode 67 through capacitance 80.

Furthermore, grid 78 of triode 67 is connected to ground through a grid leak resistor 81. Also to ground are connected cathodes 82 and 83 of triodes 67 and 75, respectively. Grid 73 of triode 75 is also connected to a variable resistance 85. The other end of resistance 85 is connected to junction 90.

It is easily seen that if the constants of a multi-vibrator circuit are properly chosen, multi-vibrator 65 will continue to oscillate until a negative pulse is introduced into the grid of the conducting tube.

As previously mentioned, the output signal of multi-vibrator 65 is introduced into the binary counter 70 through input capacitance 21. More specifically, plate 76 of triode 75 is connected to a coupling capacitance 91 which in its turn is connected to the input capacitance 21 of binary counter 70.

When switch 60 is at position A, that is, when switch 60 is set at the number 0, a pulse from multi-vibrator 65 will produce a single pulse in binary counter 70 which through series resistance 95 and diode 96 is passed to grid 98 of tube 100. The function of diode 96 will be described hereinafter in connection with Figure 3. Grid 98 of triode 100 is connected to ground through resistance 101. Plate 102 of tube 100 is connected to power supply 103. Cathode 105 of triode 100 is connected in series to a certain number, in this example three, of small neon lights 106. These neon lights 106 are designed to have a voltage drop across each one such that the voltage of cathode 105 of triode 100 is approximately for the purpose of this illustration 230 volts above ground potential.

The function of neon bulbs 106 is to maintain a relatively constant voltage drop so that the voltage variations at cathode 105 of tube 100 may be transmitted to plate 115 of diode 110 through resistance 111. The circuit shown in Figure 2 would be operative also with resistors in place of neon bulbs 106, but if resistors are used, only a portion of the voltage change occurring at cathode 105 of tube 100 will appear at plate 115 of diode 110.

When current flows through switch 60, resistance 95, diode 96 to apply a voltage to grid 98 of tube 100, the tube 100 becomes conducting when the voltage applied to grid 98 becomes equal or greater than the voltage of cathode 105, that is, 230 volts in this example.

When tube 100 is conducting, a current path exists from ground through diode 110, resistance 111 and through the three neon lights 106 to cathode 105 of tube 100 and from there to the plate 102 of tube 100. Diode 110 has its plate 115 connected through resistance 116 to the negative terminal of a D.C. power supply 117. The positive terminal of the power supply 117 is connected to ground. The potential of point 90 which is the potential of ground is now applied to resistance 85, to grid 73 of tube 75 so that grid 73 of tube 75 will also go to ground potential.

Under these conditions, tube 75 will conduct and the multi-vibrator 65 will operate. At the end of such a pulse period, however, and when no further current flows through switch 60 and through diode 96, the potential of grid 98 of tube 100 becomes negative with respect to the potential of cathode 105 so that current no longer can flow in the circuit of tube 100 so that the potential of point 90 goes from zero to 150 volts negative.

Since no current is now flowing in diode 110, point 90 goes to the potential of the D.C. power supply 117, which in this example is equal to −150 volts. When this happens, that is, when point 90 goes to −150 volts, the multi-vibrator 65 is blocked and does not send any more pulses to counter 70 through coupling capacitances 91 and 21.

It was assumed up to now that switch 60 was at position A so that only one pulse was transmitted from the multi-vibrator.

Position A as previously mentioned corresponds to the number 0 of a binary system. If switch 60 is now thrown to the B position which corresponds to the number 1 of the binary system, then two pulses from multi-vibrator 65 are now transmitted. In fact, referring back to Figure 1, it is easily seen that it takes two pulses to switch from electron tube 10 to electron tube 35 and back to electron tube 10 and to produce the negative pulse that cuts off multi-vibrator 65. Plate 102 of tube 100 is also connected to an output circuit (not shown) which operates a suitable mechanical counter.

Figure 3:
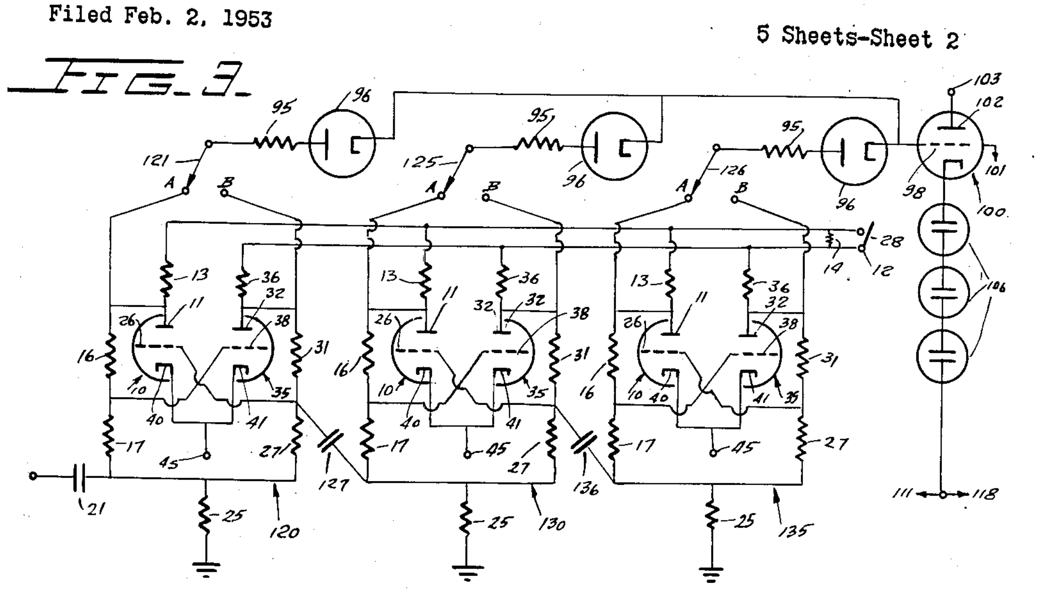
Figure 3 is a simplified circuit diagram of the binary counter system of my invention showing one binary counter and the pulse generator circuit.

Referring now to Figure 3, which is another schematic to show how divisions are achieved, only three of the binary counter circuits are there shown while actually as previously mentioned there are actually ten binary counters. When a pulse is passed from binary counter 120 which is of the type described in connection with Figure 1 through switch 121, which in this example is at the A or 0 position, it would normally operate to block tube 100, but actually the potential of grid 98 of tube 100 is still kept positive by means of the switches 125 and 126, both connected to their A or zero position in this particular example.

However, the same pulse which caused the drop of voltage of switch 121 will also flow through coupling capacitor 127 to the second binary counter 130 which will then send a negative pulse through switch 125 to the grid 98 of tube 100.

However, grid 98 of tube 100 is still maintained positive with respect to its cathode 105 by means of switch 126. The same pulse which dropped the voltage at switch 125 will now be applied to the third counter 135 through coupling capacitor 136. A negative pulse is thus generated by counter 135 and sent through switch 126 to grid 98 of tube 100. This pulse makes grid 98 of tube 100 more negative than its cathode 105 so that tube 100 now stops conduction and no further signals are produced by the multi-vibrator 65 (see Figure 2).

The function of diode 96 connected between switches 121, 125, 126 and grid 98 of tube 100 is to maintain the voltage of grid 98 at a positive level when the voltages of all plates 11 of counters 120, 130 and 135 drop by a certain preselected value.

Referring to Figure 3, it should also be noted that while two pulses operate counter 120, four pulses operate counter 130 and eight pulses operate counter 135 and so on if more than three counters are considered.

Figure 4:
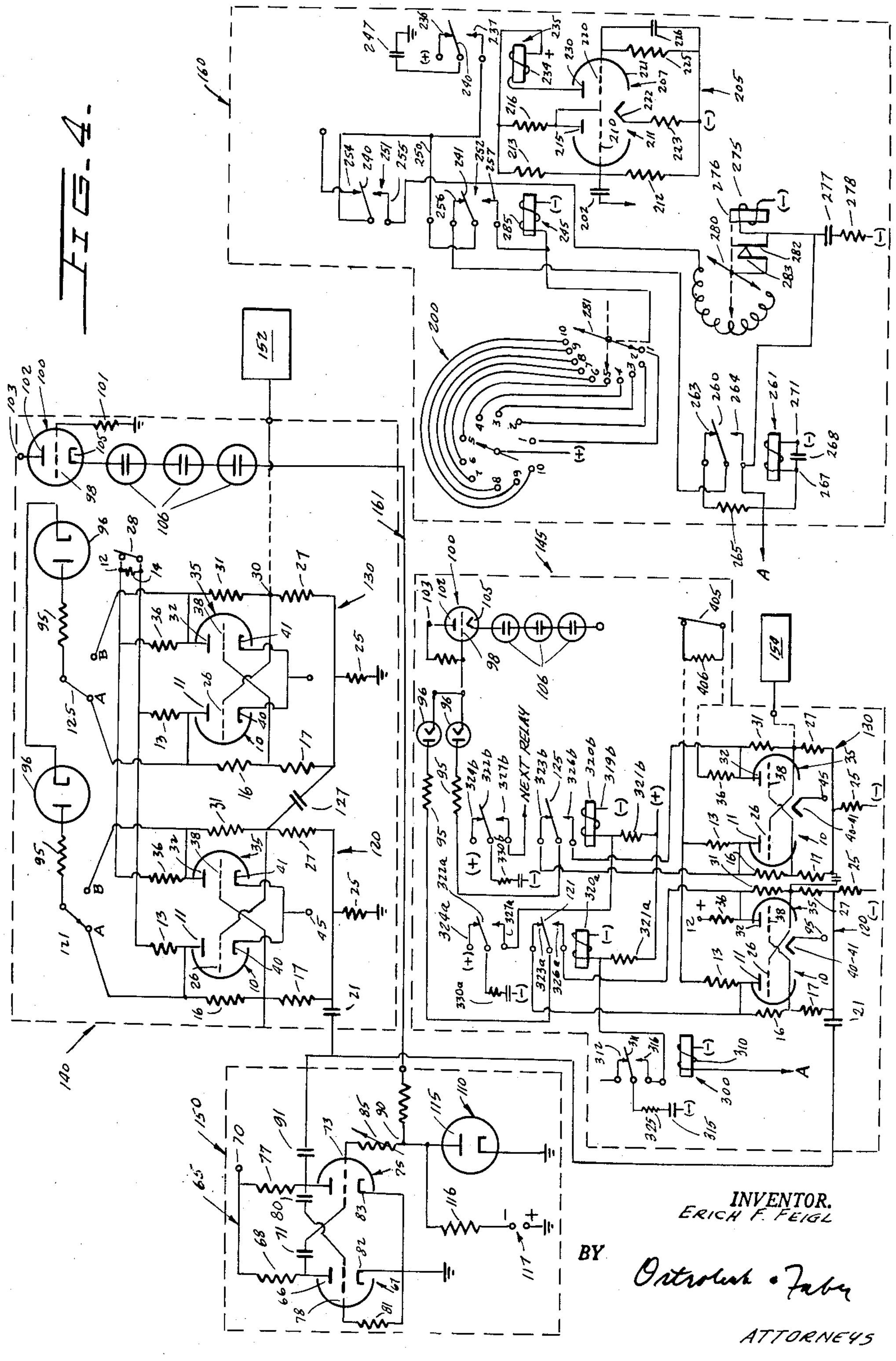
Figure 4 is a block diagram of the interpolating device of my invention showing simplified circuit diagrams.
Figure 6:
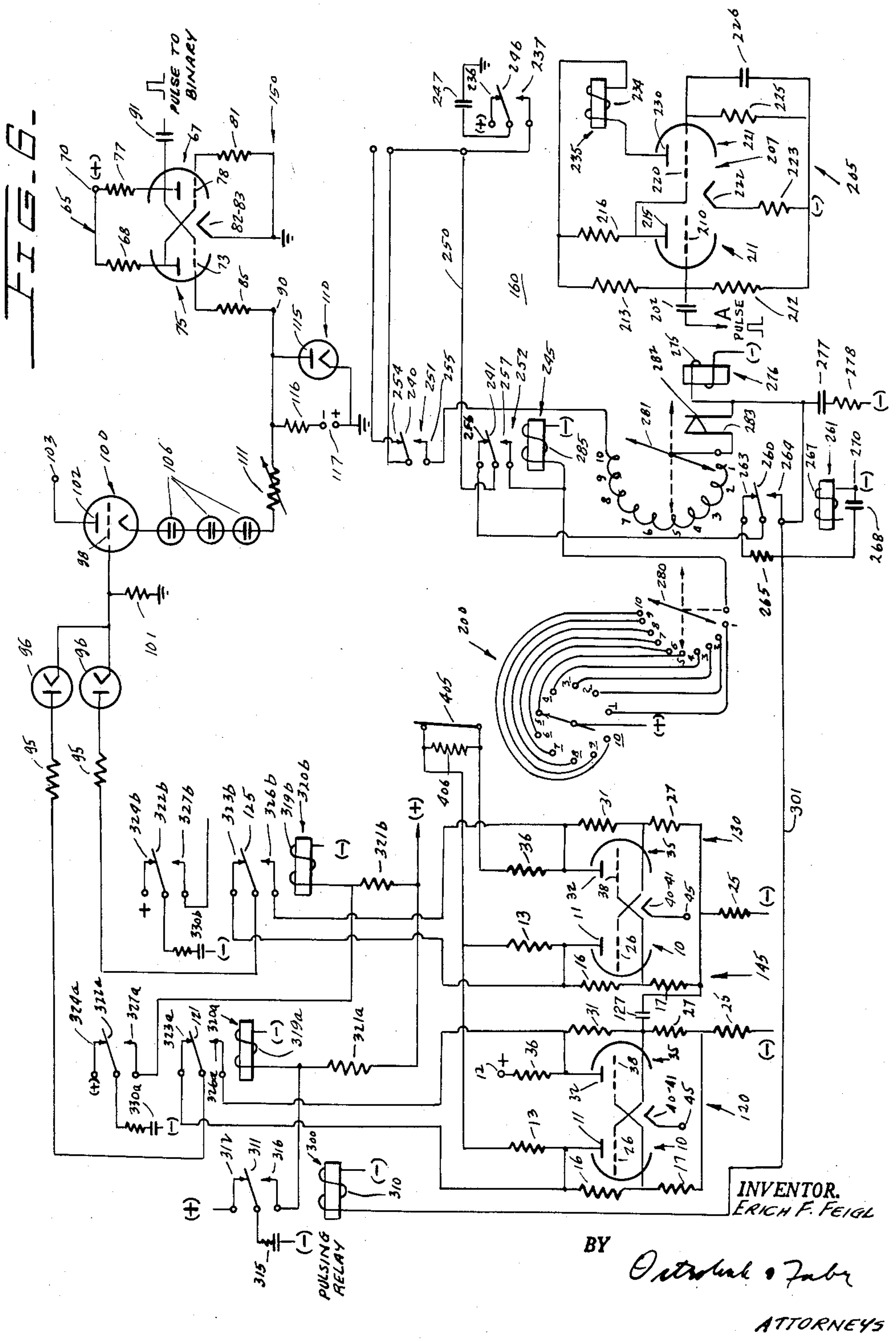
Figure 6 is a detailed circuit diagram of the compensating device of my invention.

Referring now to Figure 4 showing a block diagram of the present invention, pulse generator 150 which is of the type described in connection with Figure 2 is connected to two binary counters, the divisor counter 140 and the dividend counter 145. Divisor counter 140 is connected at its output side to mechanical counter 152. Dividend counter 145 is connected at its output side to a second mechanical counter 154. A compensator 160 for non-linear curves, hereinafter described in connection with Figure 6, is connected to dividend counter 145.

As is well-known in the art, multi-vibrator 150 generates pulses at a fixed frequency determined by the magnitudes of the resistances and capacitances forming the multi-vibrator circuit.

As previously shown, the pulses generated by multi-vibrator 150 are sent to binary counters 140 and 145 through coupling capacitor 91. Assuming now the binary counter 140 was set by means of switches 121, 125, etc. to No. 30 while the dividend counter 145 is set by means of similar switches to 90 and further assuming that both mechanical counters 152 and 154 are originally set at zero, it is now evident that after the first thirty pulses, the mechanical counter 152 connected to divisor counter 140 will register one unit more than whatever number was originally recorded on mechanical counter 152.

In this example, for the sake of simplicity, it will now be assumed that both mechanical counters 152 and 154 are originally set at zero, although it is evident that they can be at any value of the initial coordinates, the coordinates being, for example, humidity and groove number. Having made this assumption, it is easily seen that mechanical counter 152 will now register 1.

After the second set of thirty pulses, mechanical counter 152 will register two. After thirty more pulses, not only will mechanical counter 152 register three but also mechanical counter 154 connected to the output of dividend counter 145 will register one unit more than the number originally there set, that is, 1+0=1.

At this point, a negative pulse is sent by dividend counter 145 to the multi-vibrator 150 as described in connection with Figures 2 and 3 to stop the operation of the multi-vibrator 150. This negative pulse is sent to the multi-vibrator 150 through a circuit generally referred to as 161 and also described in connection with Figures 2 and 3.

If the curve whose chart is required is linear (pressure vs. groove No., temperature vs. groove No. in radiosonde devices), the above-described process is repeated with no need for compensation until a sufficiently large number of points is obtained.

If the curve whose chart is required happens to be non-linear (humidity vs. groove No.), a compensation for its non-linearity will have to be applied to the dividend counter as previously explained. For example, if it is found that the slope of this curve is such that a compensation of five is necessary after the previously described first division, the compensating circuit 160 sends a certain number of pulses to dividend counter 145 to move setting switches 121, 125, etc. to a new number, namely 90−5 or 85 in this example.

It is to be pointed out again here that it is possible to set up numbers on these counters 140 and 145 whose switches 121, 125, etc. have only two positions only if binary numbers are used as previously explained.

If, for example, number 90 is to be set on dividend counter 145, switches 121, 125 etc. would have to be set at the corresponding binary notation number which is 1011010.

The production of a negative pulse after 90 pulses have been introduced in the dividend counter 145 is made possible by the particular setting of switches 121, 125 etc. in counter 145 which in this example as abovementioned is 1011010.

When 85, or in binary notation 1010101 is to be set on counter 145, pulses are set as hereinafter described by compensator 160 to change the switch setting of counter 145 from 1011010 to 1010101.

The division by 30 is now repeated so that after the pulse generator has sent to the two binary counters 140 and 145 eighty-five pulses, mechanical counter 152 associated with divisor counter 140 will now read five, while the mechanical counter 154 associated with dividend counter 145 will now register two.

At this point again a negative pulse will be sent by dividend counter 145 to pulse generator 150 to stop the operation of the pulse generator 150.

It is quite evident, of course, that since 85÷30 produces a quotient of 2 with a remainder of .833 . . ., while 2 appears as above mentioned on mechanical counter 152, remainder .833 . . . will remain in the divisor counter 140. Before the next division, compensator 160 again sends pulses to divisor counter 145 to change its switch setting from 85 to 80. At this time pulse generator 150 starts sending pulses, after eighty of which the dividend counter 145 sends to pulse generator 150 a negative pulse to stop the operation of pulse generator 150.

Since twenty-five pulses were originally stored in divisor counter 140 from the previous operation, it is quite evident that after five of the new group of eighty pulses are sent by pulse generator 150 in divisor counter 140 and dividend counter 145, mechanical counter 152 associated with the divisor counter 140 will register one more unit than previously recorded or will now read 6.

After thirty more pulses from pulse generator 150, mechanical counter 152 associated with divisor counter 140 will read one more unit than six or in other words it will read seven, while the mechanical counter 154 associated with the dividend counter 145 will still read two.

After thirty more pulses, mechanical counter 152 will register eight, mechanical counter 154 still two.

After fifteen more pulses, that is, at the end of the eighty pulses, mechanical counter 152 will still register eight, while mechanical counter 154 will now register three since it was set at No. 80.

It is evident again that fifteen pulses are now stored in divisor counter 140 so that after compensation of the seventy-five pulses needed to change the number in mechanical counter 154 from 3 to 4, the first fifteen will produce a No. 9 in mechanical counter 152, the next thirty will produce a No. 10 and the last thirty of these seventy-five pulses will produce a No. 11 with the result that now mechanical counter 152 will read 11 while mechanical counter 154 will read 4.

This process is repeated until necessary and as a final result of this, a chart will be obtained relating the grooves of the radiosonde equipment to the correct value of humidity.

In this example it was assumed that the initial slope is determined by the ratio of 90 over 30 and that the initial coordinates $x_0$, $y_0$ are 0, 0. Calling now $y$ the coordinate corresponding to humidity and $x$ the coordinate corresponding to groove number and assuming a compensation $c=5$, an equation can be written to best approximate the slope of this humidity vs. groove curve:

$$(1)\qquad y=\frac{90-\left[\frac{c}{2}(x-1)\right]}{30}$$

It is evident that the above equation applies only to the particular example here above described, but it can be easily modified for any value of slope and for any value of initial coordinates $x_0$, $y_0$.

Referring now to Figure 8 showing the curve 400 obtained from Equation 1, the curve 405 obtainable from my interpolating device and the curves 410 and 415 showing the point by point slope variation obtained from Equation 1 and from my interpolating device, respectively, it is there seen that curve 405 approximates very closely theoretical curve 400 and to a degree of accuracy that is quite sufficient for radiosonde operation.

Slope curve 410 shows that the theoretical slope of curve 400 decreases smoothly with increasing $x$'s. Slope curve 415 on the other hand shows that the slope of curve 405 obtainable from my interpolating device does decrease with increasing $x$'s but in an irregular fashion.

Notwithstanding this, the slope curve 415 does give an indication of the general nature of the correct slope 410.

Referring now to Figure 6 showing the compensating device 160 of my present invention, it is here assumed that the required compensation is 5. This being the case, stepping switch 200 will be set at position 5.

Assuming again that dividend counter 145 was set at 90 while divisor counter 140 was set at 30, after the first operation, that is, after 90 pulses are introduced in the two counters 140 and 145 by pulse generator 150 as previously explained mechanical counter 152 associated with divisor counter 140 will read 3 while mechanical counter 154 associated with dividend counter 145 will read 1 if it is further assumed that the two mechanical counters 152 and 154 were initially set at 0.

After this operation, compensator 160 comes into operation while counters 140 and 145 remain inoperative. At this time a negative pulse is applied through capacitance 202 to binary counter 205 consisting of a double triode tube 207. Grid 210 of section 211 of double triode 207 is connected to coupling capacitance 202 to ground through resistance 212 and to the positive terminal of the power supply (not shown) through resistance 213. To the same power supply (not shown) is connected plate 215 of triode section 211 through resistance 216. Plate 215 is also directly connected to grid 220 of the second triode section 221 of double triode 207.

Double triode 207 is provided with a single cathode 222 in this particular example which is connected to ground through cathode resistor 223 which thus provides a biasing voltage for grids 210 and 220 of triode sections 211 and 221, respectively.

Grid 220 of triode section 221 is connected to ground through cathode resistor 223 which thus provides a biasing voltage for grids 210 and 220 of triode sections 211 and 221, respectively.

Grid 220 of triode section 221 is connected to ground through grid resistor 225. Grid resistor 225 is shunted by capacitance 226. Plate 230 of triode section 221 is connected to a power supply (not shown) through the winding 234 of relay 235.

Relay 235 is provided with two stationary contacts 236 and 237. Contact 236 is connected to the positive terminal of a power supply (not shown). The other stationary contact 237 is connected to the armatures 240 and 241 of relay 245. Armature 246 of relay 235 is connected to the negative terminal of the same power supply (not shown) through a capacitance 247.

When as previously mentioned a negative pulse is introduced through coupling capacitor 202 into binary counter 205, triode section 211 which was conducting just before the negative pulse was introduced into binary counter 205 now becomes non-conducting so that the potential of its plate 215 now increases suddenly to the full voltage of the power supply (not shown). Grid 220 to triode 221 electrically connected to plate 215 will then also go to a high positive value until its voltage becomes equal to or higher than the voltage of cathode 222 of triode 207.

At this time, triode section 221 becomes conducting and current flows through coil 234 of relay 235 energizing relay 235. Energization of relay 235 causes armature 246 to move from its original position of contact with stationary contact 236 to a new position in which armature 246 is in electrical contact with stationary contact 237.

Just before this operation occurred, it is necessary to point out that armature 246 of relay 235 was brought by means of capacitance 247 to the full positive voltage or the power supply. In other words, the armature of relay 235 is now charged to the full positive value of the power supply.

When a negative pulse is introduced in binary counter 205 as previously mentioned, armature 246 comes into contact with stationary contact 237 to discharge the energy stored in capacitance 247 through the circuit connected to stationary contact 237. Stationary contact 237 is connected to armature 241 of relay 245 through conductor 250. Relay 245 is provided with two pairs of stationary contacts 251 and 252. One pair of stationary contacts 251 consists of stationary contacts 254 and 255 while the other pair 252 consists of stationary contacts 256 and 257.

Stationary contact 256 is connected to the armature 260 of a relay 261. Relay 261 has two stationary contacts 263, 264. Stationary contact 263 is connected through a resistance 265 to the coil 267 of relay 261. In shunt with coil 276 of relay 261 is a capacitance 268. Junction 270 at which capacitance 268 is connected to coil 267 is grounded. When armature 246 comes in contact with stationary contact 237, a positive pulse is applied through conductor 250, armature 241 and stationary contact 256 of relay 245, armature 260, stationary contact 263 of relay 261 and through resistance 265 to capacitance 268. Capacitance 268 will now charge.

At the end of this charging period, capacitance 268 will discharge through coil 267 of relay 261 causing relay 261 to become energized and to pull its armature 260 to stationary contact 264.

In other words, relay 261 now opens its own circuit and becomes de-energized. When armature 260 comes in contact with stationary contact 264 of relay 261, a circuit from the now positive armature 246 to ground is now completed through coil 275 of stepping magnet 276.

Stationary contact 264 is not only connected to coil 275 of magnet 276 but also to ground through a capacitance 277 and a resistance 278.

Stepping magnet 276 now moves switch contacts 280 and 281 by means of an opening and closing operation of movable armature 282 with respect to stationary contact 283.

When the above process is repeated five times in this example, switch contacts 280 and 281 reach position 5 shown dotted in Figure 6, 5 being the desired compensation in this example which as previously mentioned was manually set through movement of switch arm 200 and the operation of compensator 160 terminates.

When switch contacts 280 and 281 are in the position shown dotted in Figure 6, coil 285 of relay 245 will be connected between the positive terminal of the power supply (not shown) and ground so that current will now flow through coil 285 of the relay 245 to energize relay 245. Energization of relay 245 causes its armature 241 to be pulled to stationary contact 257, thus opening the circuit for relay 261 and at the same time establishing a self-locking circuit for relay 245.

At energization of relay 245, its second armature 240 is also pulled to stationary contact 255, thus completing a restoring circuit through switch contact 281 for stepping magnet 276.

In addition to causing the above-described movement of switch arms 280 and 281, each pulse also causes the energization of relay 300 through the circuit consisting of armature 246, stationary contact 237 of relay 235, conductor 250, armature 241, stationary contact 256 of relay 245, armature 260, stationary contact 264 of relay 261 and conductor 301. Conductor 301 is connected to energizing coil 310 of relay 300, the other side of coil 310 being connected to ground.

On the first energization of relay 310, its armature 311 which was previously in electrical contact with stationary contact 312 and through stationary contact 312 to the positive side of the power supply (not shown), thus charging capacitance 315 connected between armature 311 and ground, armature 311 as previously mentioned is now pulled to make electrical contact with stationary contact 316, thus applying a positive signal to coil 319 of relay 320.

It is here necessary to point out that there is a relay similar to relay 320 for each of the binary circuits shown in Figures 3 and 4. For example, see Figures 3 and 6, there will be a relay 320 for operating movable contact 121 which then is one armature of relay 320. All coils 319 of relay 320 are continuously connected between the positive and negative terminal of the power supply (not shown), the size of resistances 321 connected between coils 319 and the positive terminal of the power supply (not shown) being such that the current flowing through coils 319 of relay 320 is not sufficient normally to produce the force necessary to pull armatures 121 and 322 of relay 320 from one set of stationary contacts 323—324 to the other set of stationary contacts 326—327.

When, on the other hand, through energization of pulsing relay 300 a positive pulse is applied to coil 319*a* of relay 320*a*, the current flowing through coil 319*a* will become sufficiently large to cause armatures 322*a* and 121 of relay 320*a* to be pulled to stationary contacts 327*a* and 326*a*, respectively, of relay 320*a*.

As is quite evident, energization of relay 320*a* causes not only a movement of setting switch 121 but also causes armature 322*a* to move from contact 324*a* connected to the positive side of a power supply (not shown) to contact 327*a* and to discharge through coil 319*b* the charge stored in capacitance 330*a* connected between armature 322*a* and ground. As in the case of capacitance 315 of relay 300, capacitance 330*a* of relay 320*a* is charged when armature 322*a* of relay 320*a* is in contact with stationary contact 324*a* and through contact 324*a* to the positive side of the power supply (not shown).

Since coil 319*b* of relay 320*b* is also connected through resistance 321*b* to the positive side of the power supply (not shown) and the size of resistance 321*b* is such that the current flowing through coil 319*b* produced by the power supply (not shown) is insufficient to operate relay 320*b*, when the positive pulse is applied to coil 319*b* of relay 320*b*, the current flowing through coil 319*b* becomes sufficiently large to pull its armatures 125 and 322*b* from one set of stationary contacts 324*b*—323*b* to the other set of stationary contacts 327*b*—326*b*.

While armature 125 is the movable contact of the second binary circuit as shown in Figure 3, armature 322*b* serves a purpose similar to that of armature 322; in other words, it serves to energize a third relay (not shown) through charging and discharging of capacitance 330*b*.

To summarize the above, when a pulse is introduced into pulsing relay 300, all the associated relays 320*a* 320*b*, etc. become energized and their armatures 322*a*, 121, 322*b*, 125, etc., respectively, are moved from one set of stationary contacts 324—323 to the other set of stationary contacts 327—326, respectively, thus causing all relays 320 to become energized.

At the end of this first pulse, pulsing relay 300 becomes de-energized and its armature 311 swings back to stationary contact 312, thus charging again capacitance 315. At the next pulse, pulsing relay 300 becomes energized again and pulls armature 311 again to stationary contact 316, discharging capacitance 315 through the circuit connected to stationary contact 316 which consists of relays 319 and resistances 321.

At this time, as hereinafter more specifically described in connection with Figures 7*a* and 7*b*, the positive pulse coming from capacitance 315 serves to de-energize relay 320*a*, thus permitting armature 322*b*, 121 of coil 320*a* to revert to the original position in contact with stationary contacts 324*a* and 323*a*, respectively.

While this pulse produces de-energization of relay 320*a*, it leaves relay 320*b* energized in that although now armature 322*a* is not any more in contact with stationary contact 327*a*, current flowing through coil 319*b* and produced by the power supply (not shown) although as previously mentioned insufficient to cause the operation of relay 320, is sufficient to maintain armatures 322*b* and 125 of coil 320*b* in contact with stationary contacts 327*b* and 319*b*, respectively.

At the end of the second pulse, pulsing relay 300 becomes de-energized. At the third pulse, pulsing relay 300 becomes energized, pulls its armature 311 in contact with stationary contact 316 so that capacitance 315 which in the previous interval of time had again charged to the full voltage of the power supply (not shown) again discharges through the circuit associated with stationary contact 316.

As this third pulse is applied to relay 320*a*, relay 320*a* becomes sufficiently energized to pull its armature 121 and 322*a* against contacts 326*a* and 327*a*, respectively. Thus, switch 121 is now in contact with stationary contact 326*a* while armature 322*a* being now in contact with stationary contact 327*a* discharges capacitance 330 which had been charged in the previous interval to the full voltage of the power supply (not shown).

When armature 322*a* comes into engagement with stationary contact 327*a*, capacitance 330*a* will discharge through coil 319*b* and resistance 321*b* of relay 320*b*, thus causing the previously energized relay 320*b* to de-energize and to release, therefore, armatures 125 and 322*b* from engagement with stationary contacts 326*b* and 327*b*, respectively, and to come into contact with stationary contacts 323*b* and 324*b*, respectively.

It is quite obvious now that if these pulses are continued for a sufficiently long time, setting switches 121, 125, etc. will be set for a new number. For example, if the original number to which switches 121, 125 were set was 90 and the compensation is 5, then after a certain number of pulses, switches 121, 125, etc. will be set to a new number, that is, 90−5 or at 85 if the compensation is negative or in other words if the curve under consideration has a decreasing slope.

The circuits shown in Figures 4 and 6 may be modified by using the first binary counter of counter unit 145 as the binary counter 225. If this is done, input capacitor 21 of binary counter 145, for example, will also function in place of capacitor 202 of counter 205. Similarly, relay 300 will also function in place of relay 245 of counter 205.

Referring now to Figure 7*a* showing a detailed view of relays 320 and their associated circuit, when armature 322 is in the position shown, the magnetic flux produced by coil 319 and in turn the inductance of coil 319 will be small in this open position of armature 322 since there is a large gap 329 between the armature 322 and the core 330 of relay 320.

On the other hand, when the coil 319 is energized, the armature 322 will be attracted to core 330, the magnetic flux produced by coil 319 will be increased and so will the inductance of coil 319. As a result, during the first operation of armature 311, a relatively small inductance is connected to the charged capacitance 315 in series with resistors 325, while during the subsequent operation of armature 311, the inductance connected to the identically charged capacitance 315 will have a relatively high value. In both cases, capacitance 315 is discharged in series through resistors 321 and inductance of coil 319. This discharge may be (*a*) aperiodic, or (*b*) periodic, viz: (*a*) If $$R>\sqrt{\frac{4L}{C}}$$

the discharge will be aperiodic, and (*b*) If $$R<\sqrt{\frac{4L}{C}}$$

the discharge will be periodic.

Accordingly, the inductance of coil 319 being relatively small, the discharge current produced by the capacitance 315 during the first operation of the armature 311 will be a simple aperiodic pulse adding to the direct current $i_0$ constantly passing through the coil 319 in series with the resistance 325.

During the subsequent discharge, however, with the inductance being relatively large, the discharge current will be periodic and reverse itself, thus decreasing the constant current $i_0$ through the relay coil 319 and resulting in a release of the armature 322.

This is more clearly shown in Figure 7*b* wherein $i_0$ is the steady relay current, $i_1$ shows the aperiodic current pulse during the first closing of the armature 311 at time $t_1$, being of simple exponential shape, and $i_2$ and $i_3$ illustrate the periodic discharge during the subsequent closing of the armature 311. As is clearly seen, reversal of the discharge current will result in a decrease of the steady holding current $i_0$ and release of the armature 322.

It was previously mentioned that when the required number of pulses is received by unit 140 (see Figure 4), a pulse is transmitted by unit 145 to stop pulse generator 150.

In the meantime, unit 145 has been operated by the same pulses until the final required number is reached. When the last number corresponding to the setting of unit 145 has been reached, the pulse generator 150 is stopped.

Figure 5:
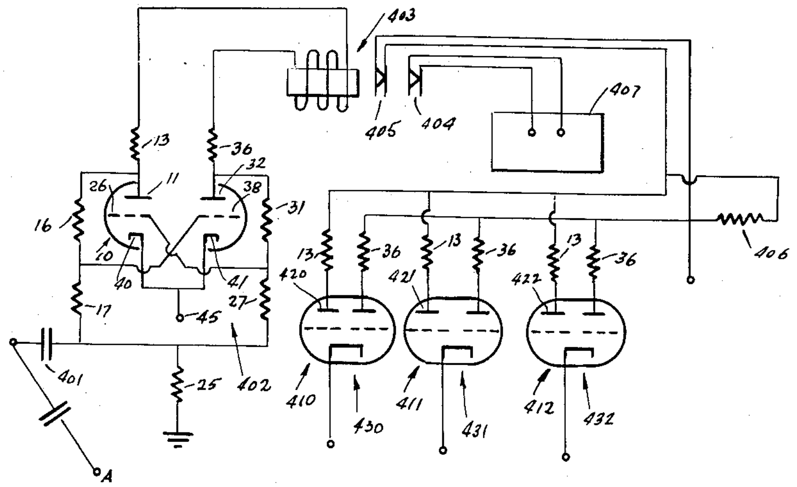
Figure 5 is a portion of the circuit diagram of the interpolating device of my invention showing the resetting device.

Referring now to Figure 5, when the last pulse is transmitted through capacitor 401 to the binary counter 402, relay 403 is energized. Its contacts 404 then operate mechanical counter 407 in a manner well-known in the art.

In addition, however, relay 403 is also provided with another set of contacts 405. The opening operation of contacts 405 produces the insertion of resistance 406 which had previously been short circuited by contacts 405 into the circuit of the electron tubes which in Figure 5 are shown to the left of each binary counter, that is, electron tubes 410, 411 and 412.

When resistance 406 is inserted in this circuit, the voltage of the plates 420, 421 and 422 of tubes 410, 411 and 412, respectively, drops to a value sufficiently low to make these particular tubes again conducting. In other words, the insertion of resistance 406 sets the binary counters 430, 431 and 432 to their original condition so that the above-described operation can be repated.

In the foregoing I have described the invention solely in connection with specific illustrative embodiments thereof. Since many variations and modifications of the invention will now be obvious to those skilled in the art, I prefer to be bound not by the specific disclosures herein contained but only by the appended claims.

I claim:

1. An interpolating device of the character described comprising first and second counters each having presetting switch means for setting up predetermined signal pulse counting totalizations in its respective counter, an output device individually connected to the output of each of said counters, circuit means for translating each counter totalization into a signal for actuating its respective device, and a signal pulse generator connected to the input of each of said counters to establish simultaneous counting by both said counters, whereby a predetermined ratio of actuations is effected upon the respective devices in accordance with the said setting up of the respective signal pulse counting totalizations in the associated counters, and further embodying means including circuit connections from one of said counters to said signal pulse generator for stopping the generator signal pulse output upon said one counter attaining its said counting totalization.

2. An interpolating device of the character described comprising first and second binary counters each having switch means for establishing predetermined signal pulse counting totalizations in its respective counter, an output device individually connected to the output of each of said counters, circuit means for translating each counter totalization into a signal for actuating its respective device, and a signal pulse generator connected to the input of each of said counters to establish simultaneous counting by both said counters, whereby a predetermined ratio of actuation is effected upon the respective devices in accordance with said setting up of the respective signal pulse counting totalizations in the associated counters, and further embodying means including circuit connections from one of said counters to said signal pulse generator for stopping the generator signal pulse output and the counting of both said counters upon said one counter attaining a predetermined counting total.

3. An interpolating device of the character described comprising first and second counters each having presetting switch means for setting up predetermined signal pulse counting totalizations in its respective counter, an output device individually connected to the output of each of said counters, circuit means for translating each counter totalization into a signal for actuating its respective device, and a signal pulse generator connected to the input of each of said counters to establish simultaneous counting by both said counters, whereby a predetermined ratio of actuations is effected upon the respective devices in accordance with the said setting up of the respective signal pulse counting totalizations in the associated counters, and further embodying a compensator operatively connected to said presetting switch means of one of said counters and arranged to alter its counting totalization setting by a predetermined amount upon the completion of each signal pulse counting totalization by the said one counter, whereby a controlled non-linear relationship is superimposed upon successive actuation ratios by said devices.

4. An interpolating device of the character described comprising first and second binary counters each having switch means for establishing predetermined signal pulse counting totalizations in its respective counter, an output device individually connected to the output of each of said counters, circuit means for translating each counter totalization into a signal for actuating its respective device, and a signal pulse generator connected to the input of each of said counters to establish simultaneous counting by both said counters, whereby a predetermined ratio of actuations is effected upon the respective devices in accordance with said setting up of the respective signal pulse counting totalizations in the associated counters, and further embodying a compensator operatively connected to said switch means of one of said counters and arranged to alter its counting totalization setting by a predetermined amount upon the completion of each signal pulse counting totalization by the said one counter, including adjustable means for presetting the amount of the said counter resetting, whereby a controlled non-linear relationship is superimposed upon successive actuation ratios by said devices.

5. An interpolating device as defined by claim 1, further including a compensator operatively connected to said presetting switch means of said one counter and arranged to alter its counting totalization setting by a predetermined amount upon the completion of each signal pulse counting totalization by the said one counter, whereby a controlled non-linear relationship is superimposed upon successive actuation ratios by said devices.

References Cited in the file of this patent

UNITED STATES PATENTS

| | | |
|---|---|---|
| 2,575,331 | Compton | Nov. 20, 1951 |
| 2,590,302 | Evans | Mar. 25, 1952 |
| 2,603,689 | Stevens | July 15, 1952 |
| 2,609,143 | Stibitz | Sept. 2, 1952 |
| 2,615,127 | Edwards | Oct. 21, 1952 |
| 2,665,846 | Gilbert | Jan. 12, 1954 |
| 2,833,941 | Rosenberg et al. | May 6, 1958 |

OTHER REFERENCES

Wild: "Predetermined Counters," Electronics, March 1947, pages 120–123.